United States Patent [19]

Hermanson

[11] 3,884,511
[45] May 20, 1975

[54] NITROGEN CHARGED SWIVEL JOINT
[75] Inventor: Dean E. Hermanson, Richardson, Tex.
[73] Assignee: Youngstown Sheet and Tube Co., Youngstown, Ohio
[22] Filed: Aug. 10, 1972
[21] Appl. No.: 279,522

[52] U.S. Cl. .................. 285/93; 285/98; 285/276; 285/DIG. 5
[51] Int. Cl. ............................................. F16l 35/00
[58] Field of Search ............ 285/98, 96, 93, DIG. 5, 285/10, 11, 276, 94; 277/86, 87, 88

[56] References Cited
UNITED STATES PATENTS

| | | | |
|---|---|---|---|
| 2,903,970 | 9/1959 | Elovitz et al. | 277/88 X |
| 2,906,548 | 9/1959 | Faccou | 285/98 X |
| 2,949,321 | 8/1960 | Tracy | 277/88 X |
| 3,053,554 | 9/1962 | Magos et al. | 285/93 X |
| 3,057,646 | 10/1962 | Brumagim | 285/96 X |
| 3,141,685 | 7/1964 | Watts | 285/93 |
| 3,177,012 | 4/1965 | Faccou | 285/94 |
| 3,190,660 | 6/1965 | Koch | 277/88 X |
| 3,241,866 | 3/1966 | Jackson | 285/98 |
| 3,351,360 | 11/1967 | Faccou | 285/98 X |
| 3,434,742 | 3/1969 | Swinney | 285/94 X |
| 3,532,364 | 10/1970 | Snyder | 285/98 |

FOREIGN PATENTS OR APPLICATIONS

| | | | |
|---|---|---|---|
| 678,477 | 1/1964 | Canada | 285/DIG. 5 |

Primary Examiner—Dennis L. Taylor

[57] ABSTRACT

A swivel joint in which seals are provided straddling the ball bearing sections of the joint, and the ball bearing section of the joint is charged with an inert gas.

5 Claims, 2 Drawing Figures

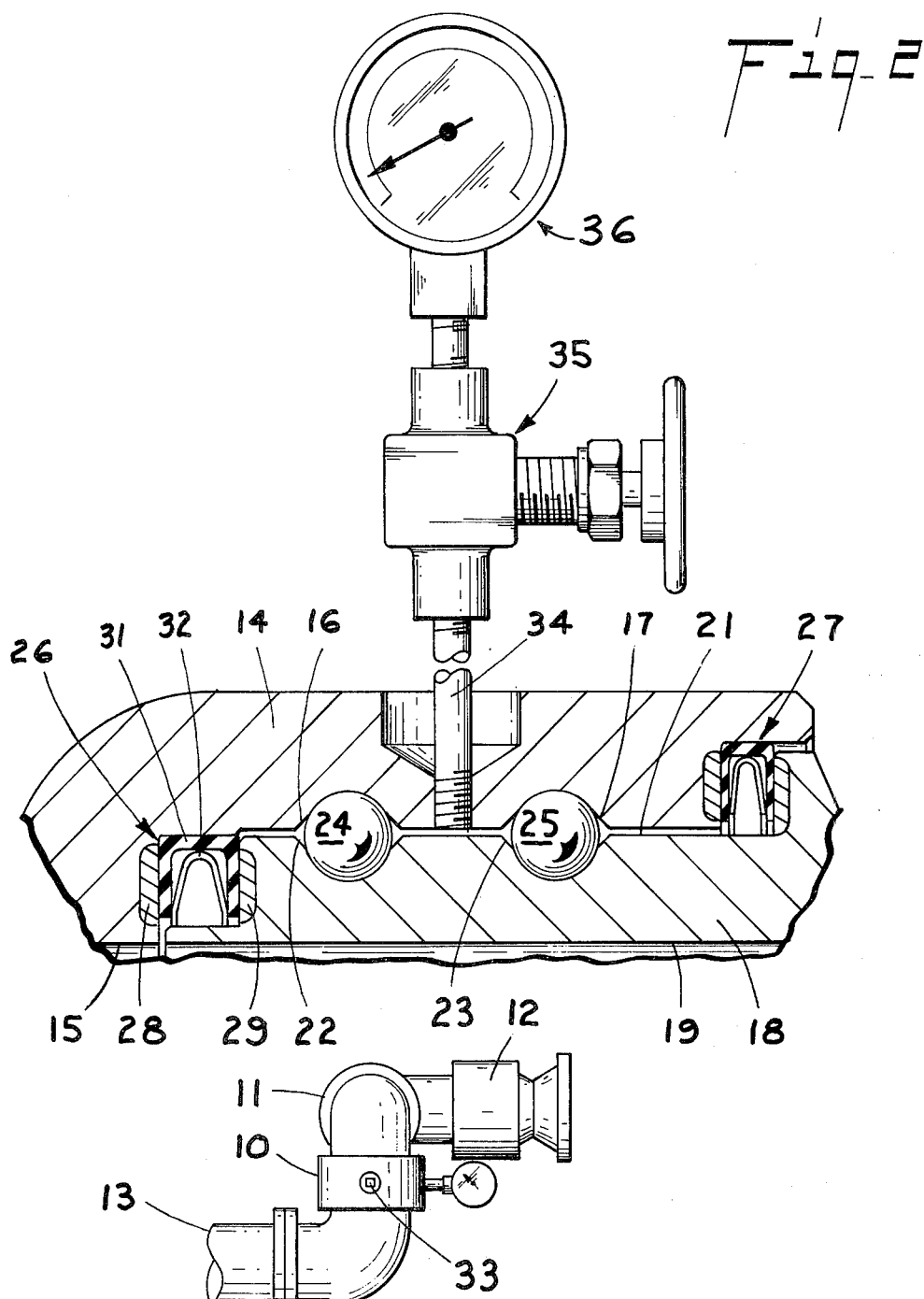

NITROGEN CHARGED SWIVEL JOINT

This invention relates to swivel joints and more particularly to swivel joints for use in cryogenic service.

Swivel joints are now being designed for use in very low temperature application. For instance, in the handling of liquified natural gas, loading arms are subjected to −265°F during handling of the LNG.

One of the problems of cryogenic type swivel joints is the ability of the lubricant to act as a lubricant. Even those lubricants designed for low temperature service become solid below −100°F.

An object of this invention is to provide a swivel joint for cryogenic service which cannot be packed with lubricant in which the bearing system is protected from the formation of oxides and any build-up of ice.

Low temperature swivel joints have utilized aluminum or stainless steel for the strength carrying members of the joint. The ball races are separate inserts. Nickel steel could be used for this service but it has a more severe reaction with oxygen to form oxides than aluminum or stainless. If nickel steel be used a homogeneous body and nipple having their races formed therein instead of inserts may be employed.

It is another object of this invention to provide a swivel joint of nickel steel with the ball bearing system protected against oxidation and the formation of ice by maintaining the ball bearing system in an inert atmosphere.

Other objects, features and advantages of this invention will be apparent from the drawing, the specification and claims.

In the drawing wherein an illustrative form of this invention is shown and wherein like numerals indicate like parts, FIG. 1 is an elevational view of a swivel joint assembly carried by a loading arm and constructed in accordance with this invention; and FIG. 2 is a fragmentary view on an enlarged scale, partly in cross-section and partly in elevation, through the seal and ball bearing assembly of one of the swivel joints shown in FIG. 1.

The swivel joint of this invention may be used in any desired service and may be used at all swivel points on a loading arm. In FIG. 1, the conventional grouping of three swivel joints 10, 11, and 12 providing for rotating in three perpendicular planes are shown at the free end of the outboard arm 13 of a loading arm. A fragment of swivel joint 10 is shown in FIG. 2. The joint includes a body 14. This body has a flow way 15 therethrough which is enlarged at the open end of the body and machined to the desired configuration for the ball bearing assembly and seals. Bearing race means are provided by the pair of bearing races 16 and 17 in the body.

The nipple 18 has a flow way 19 therethrough cooperating with flow way 15 to provide for flow of fluid through the swivel joint. The outer periphery 21 of the nipple is provided with ball bearing race means by the pair of ball races 22 and 23.

A plurality of balls such as balls 24 and 25 are positioned in bearing race means to lock the body and nipple together in a manner providing for relative rotation therebetween.

Seal means indicated generally at 26 and 27 straddle the bearing assembly.

In the seals indicated, inlays 28 and 29 of a smooth corrosion resistant metal, such as stainless steel, may be provided for cooperation with U-shaped flexible seal member 31. The seal member 31 has its free lips urged into sealing contact with the two inlays in spring 32.

Seal member 27, which is exposed to the exterior of the swivel, prevents loss of inert gas from between the seal means 26 and 27. The seal means 26, which is exposed to the interior of the swivel joint, prevents flow in either direction to contain the inert gas and to prevent flow of fluid from the flow way into the space between the seals.

The body is provided with two or more ports, one of which is closed by plug 33. The other port receives the tubing 34 to which the valve indicated generally at 35 is connected.

Initially, the gauge 36 will be removed and a source of inert gas attached to valve 35. The plug 33 is removed, the valve is opened, and the moisture ladden air within the joint is swept therefrom by the inert gas. The plug 33 is secured in place, the bearing area charged and the valve 35 closed. The source of fluid may be removed if desired. In the form shown, the source of inert fluid will be removed and the gauge 36 attached to permit periodic checks to be made to be certain that the pressure within the bearing assembly has not changed. If in operation it is found that the pressure has dropped, this would indicate that the seal 27 is not functioning properly. If the fluid being conveyed through the flow way is at a greater pressure than the seal assembly area, then an increase in pressure on the gauge 36 would indicate leakage past the seal 26.

Other control systems might readily be utilized in place of the valve 35 and gauge 36 as desired.

The inert gas should be any readily available gas which is inert to the materials of the body, nipple, and bearings. Nitrogen is preferred, as it is inexpensive and readily available. Helium, argon, neon, or crypton might also be used. Hydrogen could be used, but it has the disadvantage of being explosive.

Nickel steel such as 9% nickel steel has the ability to provide the desired physical characteristics at extreme low temperatures for swivel joints. By constructing the swivel joint from 9% nickel steel and protecting the ball bearing system with an inert gas, a highly satisfactory swivel joint can be obtained.

As the bearing system cannot be packed with liquid or grease-type lubricants, a dry lubricant such as molybdenum disulfide is used on the ball races.

The dry inert gas will be effective to prevent corrosion and ice formation in the area between the two seals 26 and 27.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A swivel joint comprising,
    a body having a flow way therethrough,
    bearing race means in the wall of the body providing said flow way,
    a nipple having a flow way therethrough,
    bearing race means in the outer periphery of said nipple,
    bearings in said bearing race means,
    seal means straddling said bearing race means,
    and an inert gas under positive pressure in the space between said seals, the seal means exposed to the exterior of said swivel joint preventing loss of said inert gas from between said seal means, the seal means exposed to the interior of said swivel joint preventing flow in either direction to contain said inert gas and prevent flow of fluid from said flow way into the space between said seals, said body and nipple in the area between said seal means impervious to prevent flow of fluid to or from said area.

2. The swivel joint of claim 1 wherein the inert gas is selected from the group consisting of nitrogen, helium, argon, neon, and crypton.

3. The joint of claim 1 wherein spaced ports are provided in the body communicating with the race way, a plug seals one port, and a valve controls flow through the other port.

4. The swivel joint of claim 1 wherein the body and nipple are fabricated of 9% nickel steel.

5. The swivel joint of claim 1 wherein the nipple and housing are fabricated of nickel steel and the inert gas is nitrogen.

* * * * *